United States Patent [19]

Krevalis, Jr. et al.

[11] Patent Number: 5,494,597
[45] Date of Patent: Feb. 27, 1996

[54] REFRIGERATION WORKING FLUID COMPOSITIONS CONTAINING DIFLUOROETHANE OR PENTAFLUOROETHANE AND A POLYOLESTER LUBRICANT

[75] Inventors: Martin A. Krevalis, Jr.; Richard H. Schlosberg; Carolyn B. Duncan, all of Baton Rouge, La.

[73] Assignee: Exxon Chemical Patents Inc., Wilmington, Del.

[21] Appl. No.: 298,515

[22] Filed: Aug. 30, 1994

Related U.S. Application Data

[63] Continuation of Ser. No. 1,482, Jan. 7, 1993, abandoned.

[51] Int. Cl.$^6$ ............ C09K 5/04; C10M 105/34; C10M 105/38
[52] U.S. Cl. ............ 252/68; 252/67; 252/56 R; 252/56 S
[58] Field of Search ............ 252/68, 67, 56 S, 252/56 R

[56] References Cited

U.S. PATENT DOCUMENTS

| | | | |
|---|---|---|---|
| 4,755,316 | 7/1988 | Magid et al. | 252/68 |
| 4,851,144 | 7/1989 | McGraw et al. | 252/52 A |
| 5,021,179 | 6/1991 | Zehler et al. | 252/54.6 |
| 5,096,606 | 3/1992 | Hagihara et al. | 252/68 |
| 5,202,044 | 4/1993 | Hagihara et al. | 252/68 |
| 5,229,025 | 7/1993 | Carter et al. | 252/68 |

FOREIGN PATENT DOCUMENTS

| | | |
|---|---|---|
| 04069479 | 1/1990 | European Pat. Off. . |
| 0406479 | 1/1991 | European Pat. Off. . |
| 0415778 | 3/1991 | European Pat. Off. . |
| 0430657 | 6/1991 | European Pat. Off. . |
| 0435253 | 7/1991 | European Pat. Off. . |
| 0440069 | 8/1991 | European Pat. Off. . |
| 0449406 | 10/1991 | European Pat. Off. . |
| 0475751 | 3/1992 | European Pat. Off. . |
| 0480479 | 4/1992 | European Pat. Off. . |
| 0479338 | 4/1992 | European Pat. Off. . |
| 0498152 | 8/1992 | European Pat. Off. . |
| 2216541 | 10/1989 | United Kingdom . |
| 90/12849 | 11/1990 | WIPO . |
| WO90/12849 | 11/1990 | WIPO . |

*Primary Examiner*—Christine Skane
*Attorney, Agent, or Firm*—Richard D. Jordan

[57] ABSTRACT

There are disclosed refrigeration working fluid compositions comprising R125 (pentafluoroethane) or R152a (1,1-difluoroethane) refrigerants and certain polyol esters of $C_7$ to $C_{10}$ branched alkanoic acids or mixtures of such branched acids with linear $C_7$ to $C_{10}$ monoalkanoic acids. The polyols are neopentylglycol, technical grade pentaerythritol and trimethylolpropane; the esters exhibit suitable viscosity ranges and miscibility with refrigerants over a broad compositional range. The acids have a defined average effective carbon chain length in order to be miscible with the refrigerants over the range of 5 to 55 wt. % ester lubricant.

12 Claims, No Drawings

REFRIGERATION WORKING FLUID COMPOSITIONS CONTAINING DIFLUOROETHANE OR PENTAFLUOROETHANE AND A POLYOLESTER LUBRICANT

This is a continuation of application Ser No. 001,482, filed Jan. 7, 1993 now abandoned.

This application is related to application Ser. No. 804,314, filed Dec. 6, 1991.

BACKGROUND OF THE INVENTION

1. Field of the Invention

The invention relates to refrigeration working fluid compositions. More particularly, this invention relates to refrigeration working fluid compositions comprising mixtures of difluoroethane and pentafluoroethane refrigerants and certain polyol ester lubricants having suitable viscosities and which are miscible with the refrigerant at low temperatures.

2. Description of Related Art

Cooling systems of the mechanical vapor recompression type, including refrigerators, freezers, heat pumps, air conditioning systems, and the like, are well known. In such devices, a refrigerant of suitable boiling point evaporates at low pressure, taking heat from the surrounding zone. The resulting vapor is then compressed and passed to a condenser where it condenses and gives off heat to a second zone. The condensate is then returned through an expansion valve to the evaporator, so completing the cycle.

It is recognized that currently used refrigerants which contain chlorine, such as dichlorodifluoromethane, will be replaced by chlorine-free refrigerant fluids because of the adverse effect of the chlorinated materials upon the atmospheric ozone layer. Tetrafluoroethane isomers and in particular "Refrigerant 134a", which 1,1,1,2-tetrafluoroethane, are now considered desirable fluids for use in refrigeration systems. "Refrigerant 152a"(1,1-difluoroethane) and "Refrigerant 125"(pentafluoroethane) are also considered as suitable chlorine-free refrigerants.

Refrigeration working fluids are required to have a lubricant which is compatible and miscible with the refrigerant so that moving parts of the system are properly lubricated. Heretofore, such lubricants have been composed of hydrocarbon mineral oils which are miscible with the chlorine-containing refrigerant fluids and which provide effective lubrication.

The use of tetrafluoroethane and other fluorocarbon, chlorine-free refrigerants has created a need for new lubricants, since mineral oils are not compatible with these materials. This need is well recognized in the art and there are numerous recent publications and patents disclosing various types of synthetic lubricants which are said to be compatible with fluorocarbon refrigerant fluids. Esters of polyols are being particularly emphasized as being suitable for use with the chlorine-free, fluorocarbon refrigerants.

U.S. Pat. No. 5,021,179, issued Jun. 4, 1991 to Zehler et al., discloses esters of polyols in which the acyl groups have at least 22% of (a) branched acyl groups or (b) acyl groups which contain no more than six carbon atoms. This patent also indicates that the esters have a certain ratio of the number percent of acyl groups that have 8 or more carbon atoms and are unbranched to the number percent of acyl groups that are branched and contain no more than 6 carbon atoms, and that this ratio is not greater than 1.56. Also, the patent requires that the number percent of acyl groups having at least 9 carbon atoms, branched or not branched, will be not greater than 81.

PCT Application WO 90/12849 published Nov. 1, 1990 by Jolley et al. discloses generally liquid compositions containing a major amount of at least one fluorine-containing hydrocarbon containing one or two carbon atoms and a minor amount of at least one soluble organic lubricant comprising at least one carboxylic ester of a polyhydroxy compound containing at least two hydroxy groups and having the formula $R[OC(O)R']_n$ where R is hydrocarbyl, each R' is independently hydrogen, straight chain lower hydrocarbyl, a branched chain hydrocarbyl group, or a straight chain hydrocarbyl group containing from 8 to about 22 carbon atoms, provided that at least one R' group is hydrogen, a lower straight chain hydrocarbyl or a branched chain hydrocarbyl group, or a carboxylic acid-containing or carboxylic acid ester-containing hydrocarbyl group, and n is at least 2.

U.K. Patent No. 2,216,541, issued Oct. 23, 1991, to Imperial Chemical Industries and published Oct. 11, 1989, discloses the use of any ester of molecular weight 250 or greater as being suitable for use as compatible lubricants with Refrigerant 134a(R134a) and some related refrigerant fluids. The patent exemplifies adipates, pyromellitates and benzoates.

European Published Patent Application 440069 published Aug. 7, 1991 by Kao Corporation discloses refrigeration working fluids composed of fluoroethanes and esters prepared by reacting an aliphatic polyol and a straight or branched chain alcohol with an aliphatic polycarboxylic acid having 2 to 10 carbon atoms.

European Published Application 415778 published Mar. 6, 1991 by Kao Corporation discloses refrigeration working fluid composition containing hydrogenated fluoroethane and an ester compound obtained from an aliphatic polyhydric alcohol, a saturated aliphatic dicarboxylic acid and a saturated aliphatic monocarboxylic acid.

European Published Application 406479 published Jan. 9, 1991, by Kyodo Oil Technical Research Center Co., Ltd., discloses lubricants which are said to be compatible with R134a. Suitable lubricants are: esters of neopentyl glycol and a straight or branched-chain monovalent fatty acid having 3 to 18 carbon atoms; esters of pentaerythritol, dipentaerythritol and tripentaerythritol with straight or branched chain $C_2$ to $C_{18}$ monovalent fatty acids; esters of a trihydroxy polyvalent alcohol of the formula $RC(CH_2OH)_3$ where R is $C_1$ to $C_3$ alkyl with a straight or branched-chain monovalent fatty acid having 2 to 18 carbon atoms and not more than 25 mole % per total fatty acid of at least one polybasic acid having carbon number of 4 to 36.

European Published Application 435253 published Jul. 3, 1991 by Nippon Oil Co., Ltd. discloses a number of esters said to be compatible with R134a, the esters being defined as having specific structures and being esters of mono-, di- and tripentaerythritol and other polyols such as trimethylolethane, trimethylolpropane, trimethylolbutane or dimers or trimers thereof with monocarboxylic acids having 2 to 15 carbon atoms and dicarboxylic acids having 2 to 10 carbon atoms. The esters are generally said to have molecular weights of about 200 to 3000.

European Published Application 430657 published Jun. 5, 1991 by Ashai Denka Kogyo Kabushiki discloses lubricants compatible with R134a which are characterized as being neopentyl polyol ester of a fatty acid having 2 to 6 carbon atoms. It is said in this publication that the use of acids having 7 or more carbon atoms will result in incompatibility if the amount of $C_2$ to $C_6$ acids is not 20 mol % or greater such that the average number of carbon atoms of the fatty acids per hydroxyl group of the neopentylpolyol is 6 or below. Suitable neopentyl polyols include mono-, di and tripentaerythritol, trimethylolpropane, and trimethylolethane. The polyols must have at least 3 OH groups.

Other references dealing with the problem of R134a lubricant compatibility are U.S. Pat. No. 4,851,144, issued Jul. 25, 1989 to McGraw et al. which discloses mixtures of polyether polyols and esters as lubricants and U.S. Pat. No. 4,755,316, issued Jul. 5, 1988 to Magid et al. which discloses polyether glycols are lubricants for tetrafluoroethane refrigerants.

European Published Application 475751 published Mar. 18, 1992 by Kao Corporation discloses refrigerant working fluids comprising a hydrofluorocarbon and an ester prepared from a neopentyl polyol and a saturated branched $C_7$ to $C_9$ aliphatic monocarboxylic acid and similar esters containing an epoxycyclohexyl or epoxycyclopentyl group.

U.S. Pat. No. 5,096,606, issued Mar. 17, 1992 to Hagihara et al. discloses refrigeration oil compositions comprising a hydrogenated fluoroethane and an ester of an aliphatic polyol having 1 to 6 OH groups and a mixture of straight or branched chain $C_2$ to $C_9$ monocarboxylic acids and $C_2$ to $C_{10}$ straight or branched chain dicarboxylic acids, the ester being formed by reacting the three components together.

European Published Application 480479 published Apr. 15, 1992 by Kyodo Oil Technical Research Center Co., Ltd. discloses refrigeration lubricants based on the ester formed by reacting either mono-, di- or tripentaerythritol with a straight or branched chain monovalent $C_2$ to $C_{18}$ saturated fatty acid.

European Published Application 498152 published Aug. 12, 1992 by CPI Engineering Services, Inc., teaches a lubricant composition for non-chlorine refrigerants prepared from polyols including neopentyl alcohol, trimethylol propane, trimethylol ethane, mono-and dipentaerythritol and branched carboxylic acids having 4 to 18 carbon atoms. The branched acids are preferably those wherein the branching is at a location other than the most distant carbon.

European Published Application 479338, published Apr. 8, 1992 by Kyodo Oil Technical Research Center Co., Ltd. discloses lubricants for chlorine-free hydrofluorocarbon refrigerants which are esters prepared from trimethylol ethane, trimethylol propane or trimethylol butane and at least one straight or branched chain monovalent saturated fatty acid having 2 to 18 carbon atoms.

European Published Application 449406, published Oct. 2, 1991 by Tonen Corporation, teaches a lubricant ester for use with 1,1,1,2-tetrafluoroethane (R134a) which is generally described as an ester having a viscosity at 100° C. of between 2 and 30 mm$^2$/s and preferably the ester is a diester of an aliphatic monohydric alcohol and an aliphatic or aromatic dicarboxylic acid, but various other types of esters are disclosed including esters of polyols with $C_5$ to $C_{12}$ straight or branched chain carboxylic acids.

The prior art summarized above presents a conflicting picture of which lubricants are suitable for use with fluorocarbon refrigerants. The present inventors have found that, with respect to polyol esters of alkanoic acids, their suitability for use as compatible lubricants with 1,1-difluoroethane (R152a) and pentafluoroethane (R125), is governed by certain parameters related to the structure and chain length of acids used to esterify the polyols and that these parameters have not been recognized the extensive prior art teachings in the field.

SUMMARY OF THE INVENTION

The present invention is based on the discovery that esters of neopentyl glycol, trimethylol propane or technical grade pentaerythritol (as defined below) will provide lubricant esters having suitable viscosity ranges and miscibility values of −20° C. or less when admixed with R152a or R125, when such esters are prepared from branched $C_7$ to $C_{10}$ monoalkanoic acids or mixtures of branched and linear $C_7$ to $C_{10}$ monoalkanoic acids provided the acid or acid mixture has a certain effective carbon chain length. The effective carbon chain length will vary somewhat depending upon the particular polyol used and whether the ester is to be used with R152a or R125. Such admixtures of lubricant ester and refrigerant, e.g., R152a or R125, are hereinafter referred to as refrigeration working fluids.

Effective carbon chain length as used herein refers to the length of the longest continuous carbon chain in the acid molecule. For example, a trimethylhexanoic acid, which has a total of 9 carbon atoms, has an effective carbon chain length of 6.0. For mixtures of acids, the average effective carbon chain length is calculated as explained below.

DETAILED DESCRIPTION OF THE INVENTION

A first embodiment of this invention is a refrigeration working fluid comprising about 5 to 55, preferably 10 to 35, parts by weight of a synthetic polyol ester lubricant and about 95 to 45, preferably 90 to 65, parts by weight of 1,1-difluoroethane refrigerant, the ester having a viscosity range of from about 8 to about 130 cSt. at 40° C. and the working fluid having a miscibility value of −20° C. or less (meaning a lower temperature), where the ester is prepared by reacting:

(a) neopentylglycol or trimethylolpropane with a branched $C_7$ to $C_{10}$ alkyl monocarboxylic acid (or mixtures thereof) or a mixture of branched and linear $C_7$ to $C_{10}$ alkyl monocarboxylic acids, the acid or acid mixture having an effective carbon chain length equal to or less than 8.0, or (b) technical grade pentaerythritol with a branched $C_7$ to $C_{10}$ alkyl monocarboxylic acid (or mixtures thereof) or a mixture of branched and linear $C_7$ to $C_{10}$ alkyl monocarboxylic acids, the acid or acid mixture having an average effective carbon chain length less than 8.0.

For the foregoing esters, when mixtures of branched and linear acids are used, the mixtures should contain at least about 25 wt. %, preferably at least about 75 wt. % of branched acid, based on the total weight of acids in the acid mixture.

Another embodiment of the invention is a refrigeration working fluid comprising about 5 to 55, preferably 10 to 35, parts by weight of a synthetic polyol ester lubricant and about 95 to 45, preferably 90 to 65, parts by weight of pentafluoroethane refrigerant, the ester having a viscosity range of from about 8 to about 130 cSt 40° C. and the working fluid having a miscibility value of −20° C. or less, wherein the ester is prepared by reacting (i) technical grade pentaerythritol (TPE) (defined as containing 85 to 92% by weight monopentaerythritol, 14 to 7% by weight dipentaerythritol and up to 2% by weight tripentaerythritol) with a branched $C_7$ to $C_{10}$ alkyl monocarboxylic acid (or mixtures thereof) or a mixture of branched and linear $C_7$ to $C_{10}$ alkyl monocarboxylic acids, the acid or acid mixture having an effective carbon chain length of less than 7.2; or (ii) trimethylolpropane (TMP) with a branched $C_7$ to $C_{10}$ alkyl monocarboxylic acid (or mixtures thereof) or a mixture of branched and linear $C_7$ to $C_{10}$ alkyl monocarboxylic acids, the acid or acid mixture having an effective carbon chain length of less than 8.0; or (iii) neopentyl glycol (NPG) with a branched $C_7$ to $C_{10}$ alkyl monocarboxylic acid (or mixtures thereof) or a mixture of branched and linear $C_7$ to $C_{10}$ alkyl monocarboxylic acids, the acid or acid mixture having an effective carbon chain length equal to or less than 8.0.

For the foregoing esters, when mixtures of branched and linear $C_7$ to $C_{10}$ acids are used, there should be present at least about 25 wt. %, preferably at least about 75 wt. %, of branched $C_7$ to $C_{10}$ monoalkanoic acid, based on the total weight of acids in the acid mixture.

A further embodiment of this invention comprises refrigeration working fluids based on mixtures of refrigerants, i.e., mixtures which may contain R152a and/or R125. If said mixture comprises at least 35 wt. % R152a or R125, then a suitable lubricant ester for said mixture will be any of the esters described above which are suitable for use when R152a or R125 is the sole refrigerant used in the refrigeration working fluid composition. Such mixtures may contain other fluorocarbon refrigerants such as either isomer of tetrafluoroethane, difluoromethane, trifluoromethane and the like. An example of such a mixture is one composed of 40 wt. % R125, 15 wt. % R134a (1,1,1,2-tetrafluoroethane) and 45 wt. % R143a (1,1,1-trifluoroethane). For this mixture a suitable ester lubricant would be the TMP, TPE or NPG esters described above as being suitable for use with pentafluoroethane (R125).

As used herein, the term "miscibility value" refers to the highest temperature at which immiscibility occurs over the composition range of 10 to 35 parts by weight of synthetic ester lubricant and 90 to 65 parts by weight of refrigerant (R152a or R125).

Miscibility and immiscibility is determined in the following manner. A measured quantity of ester lubricant is poured into a valved glass tube of 12 mm I.D. The tube is connected to a refrigerant charging unit, where air is evacuated and a set volume of refrigerant is condensed into the glass tube until a desired refrigerant gas pressure drop is obtained. The composition of the lubricant/refrigerant mixture is calculated from weight measurements taken of the tube, tube plus lubricant, and tube plus lubricant plus refrigerant. The tube containing the lubricant/refrigerant is visually observed for miscibility at room temperature, in a high temperature visibility bath where the temperature is thermostatically controlled up to −60° C. or higher, and in a low temperature visibility bath where the temperature is thermostatically controlled down to −80° C. The mixture is considered miscible to a given temperature if none of the following conditions is observed: cloudiness, formation of floc or precipitate, separation into two liquid layers. The mixture is considered immiscible if any of these conditions is observed.

In the data included in the examples, miscibility temperature refers to the lowest temperature at which miscibility is observed at the given composition. The highest of these temperatures is the miscibility value for working fluids having that ester lubricant.

For mixtures of acids, average effective carbon chain length (AECL) is calculated by using the formula:

$$AECL = \frac{[W_1(ECL_1)] + [W_2(ECL_2)] + \ldots [W_n(ECL_n)]}{(W_1 + W_2 + \ldots + W_n)}$$

where $W_1$ is the weight of first acid in the mixture and $ECL_1$ is its effective carbon chain length, $W_2$ is the weight of the second acid in the mixture and $ECL_2$ is its effective carbon chain length and this formula is continued for the "n" number of acids in a mixture. The formula is therefore the weighted average of the individual effective carbon chain lengths for every acid in a mixture of acids. The term "effective carbon chain length" when used herein with respect to mixtures means the AECL as calculated above.

The acids useful herein may be represented by the formula RCOOH where R represents a linear or branched alkyl group such that the total number of carbon atoms in the acid is 7 to 10. 50% or more methyl branching is preferred. Branched acids having 100% methyl branching are preferred and 3,5,5-trimethylhexanoic acid is particularly preferred for use in this invention.

Branched alkyl groups refer to the numerical total of all the alkyl group in the molecule which are pendant to the backbone alkyl, i.e., the longest linear carbon chain in the acid molecule, meaning the carbon chain attached to and including the carboxyl carbon (—C(:O)OH).

When mixtures of acids are referred to herein the percentage by weight is based on the total weight of the acids, linear and branched, which are used to react with the particular polyol.

The present invention avoids the use of esters of relatively lower ($C_2$ to $C_6$) alkyl carboxylic acids as lubricants, since such lower acids are more volatile, more odorous, and their esters exhibit greater solvation power and are more hydrophilic, all of which are undesirable properties and can result in refrigeration working fluids which have disadvantages. The use of relatively higher alkyl acids such as $C_7$ to $C_{10}$ branched and linear alkyl monocarboxylic acids is desirable because the backbone alkyl length and the branchiness provides a desired viscosity to the ester lubricant. The resulting ester of such acids is less hydrophilic, and using acids in this range permits a broader range of polyols to be used because of the viscosity advantage. However, only acids having the effective carbon chain length esterified with certain polyols as noted above will provide esters which, when admixed with the R152a and R125 refrigerants, will result in refrigeration working fluids which have satisfactory miscibility values. Thus, it is not the total number of carbon atoms in the acid, or the relative amounts of branched acids or linear acids which provide esters which, when admixed with refrigerants, have satisfactory miscibility values, rather it is the effective carbon chain length of the acid or the average effective carbon chain length of a mixture of acids which are the key parameters, and the effective carbon chain length parameter will vary somewhat depending upon the polyol which is being employed to form the ester.

When using 3,5,5-trimethylhexanoic acid, it may be desirable, depending on the exact viscosity required, to add to it very minor amounts, e.g. 1 to 10 wt. %, of another acid, such as the mixture of $C_7$ acids referred to above, to improve the low temperature properties of the ester product.

Esters for use in the invention are prepared by reacting alcohols with acids, preferably a molar excess of acid, using esterification techniques well known in the art at elevated temperatures. Catalysts such as organotin or organotitanium catalysts may be used if desired. The particular method for preparing esters useful in the invention is not critical to the practice of this invention, so long as substantially complete esterification is achieved.

As is well known in the art, the suitable ester lubricants of this invention may contain very minor proportions of various special purpose additives, up to about 8% weight cumulatively, such as metal deactivators, antioxidants, corrosion inhibitors, defoaming agents, anti-wear agents, extreme pressure resistant additives, viscosity improvers, and the like.

The invention is further illustrated by the following examples which are not to be considered as limitative of its scope. All percentages reported are by weight.

EXAMPLE 1

Esters of NPG, TMP and TPE with various acids were prepared and mixed with R152a in the proportions indicated; the miscibility values and average effective carbon chain length (AECL) values are given in Table 1. The esters are listed by showing the acids and polyols used to make the esters. Viscosities of the esters in centistokes (cSt.) at 40° C. and 100° C. are also reported listed by showing the polyol and acid used to make the esters. Ester viscosities in centistokes (cSt.) at 40° C. and 100° C. are also reported.

TABLE 1

| Acid/Polyol | cSt Viscosity (1) 40° C. (2) 100° C. | | AECL | wt. % Lubricant | wt. % R152a | Miscibility Value |
|---|---|---|---|---|---|---|
| A. 3,5,5-trimethyl-hexanoic/TMP | (1) | 51.50 | 6.0 | 10 | 90 | −80° C. |
|  | (2) | 7.07 |  | 25 | 75 | −80° C. |
|  |  |  |  | 35 | 65 | −80° C. |
| B. 3,5,5-trimethyl-hexanoic/NPG | (1) | 13.02 | 6.0 | 10 | 90 | −80° C. |
|  | (2) | 3.12 |  | 25 | 75 | −80° C. |
|  |  |  |  | 35 | 65 | −80° C. |
| C. Iso-decanoic/TMP | (1) | 46.83 | 8.0 | 10 | 90 | −60° C. |
|  | (2) | 7.60 |  | 25 | 75 | −40° C. |
|  |  |  |  | 35 | 65 | −40° C. |
| D. Iso-nonanoic/TMP | (1) | 40.31 | 7.2 | 10 | 90 | −80° C. |
|  | (2) | 6.14 |  | 25 | 75 | −80° C. |
|  |  |  |  | 35 | 65 | −80° C. |
| E. 2-ethylhexanoic/TMP | (1) | 25.49 | 6.0 | 10 | 90 | −80° C. |
|  | (2) | 4.35 |  | 25 | 75 | −80° C. |
|  |  |  |  | 35 | 65 | −80° C. |
| F. 12.8% methylhexanoic, 22.2% n-heptanoic, 65% 3,5,5-trimethyl-hexanoic/TMP | (1) | 28.18 | 6.2 | 10 | 90 | −80° C. |
|  | (2) | 5.10 |  | 25 | 75 | −80° C. |
|  |  |  |  | 35 | 65 | −80° C. |
| G. methylhexanoic/TPE | (1) | 28.00 | 5.7 | 10 | 90 | −80° C. |
|  | (2) | 5.20 |  | 25 | 75 | −80° C. |
|  |  |  |  | 35 | 65 | −80° C. |
| H. 2-ethylhexanoic/TPE | (1) | 50.17 | 6.0 | 10 | 90 | −80° C. |
|  | (2) | 6.73 |  | 25 | 75 | −80° C. |
|  |  |  |  | 35 | 65 | −80° C. |
| I. 15% iso-octanoic, 85% 3,5,5-trimethyl-hexanoic/TPE | (1) | 114.50 | 6.1 | 10 | 90 | −80° C. |
|  | (2) | 11.66 |  | 25 | 75 | −80° C. |
|  |  |  |  | 35 | 65 | −80° C. |
| J. 25% isodecanoic, 75% 3,5,5-trimethyl-hexanoic/TPE | (1) | 111.52 | 6.6 | 10 | 90 | −80° C. |
|  | (2) | 11.51 |  | 25 | 75 | −80° C. |
|  |  |  |  | 35 | 65 | −80° C. |
| K. Isononanoic/TPE | (1) | 83.92 | 7.2 | 10 | 90 | −70° C. |
|  | (2) | 9.93 |  | 25 | 75 | −50° C. |
|  |  |  |  | 35 | 65 | −50° C. |
| L. Isodecanoic/TPE | (1) | 90.98 | 8.0 | 10 | 90 | −30° C. |
|  | (2) | 10.40 |  | 25 | 75 | 0° C. |
|  |  |  |  | 35 | 65 | 0° C. |

EXAMPLE 2

Esters of TMP, NPG and TPE with various acids were prepared and mixed with R125 in various proportions and the miscibility values obtained are reported below in Table 2. "None" means the ester and R125 were not miscible at any temperature for the proportions tested. The esters are

TABLE 2

| Acid/Polyol | cSt Viscosity (1) 40° C. (2) 100° C. | | AECL | wt. % Lubricant | wt. % R152a | Miscibility Value |
|---|---|---|---|---|---|---|
| A. 3,5,5-trimethyl-hexanoic/NPG | (1) | 13.02 | 6.0 | 10 | 90 | −80° C. |
|  | (2) | 3.12 |  | 25 | 75 | −80° C. |
|  |  |  |  | 35 | 65 | −80° C. |
| B. 3,5,5-trimethyl-hexanoic/TMP | (1) | 51.50 | 6.0 | 10 | 90 | −80° C. |
|  | (2) | 7.07 |  | 25 | 75 | −80° C. |
|  |  |  |  | 35 | 65 | −80° C. |
| C. 2-ethylhexanoic/TMP | (1) | 25.49 | 6.0 | 10 | 90 | −80° C. |
|  | (2) | 4.35 |  | 25 | 75 | −80° C. |
|  |  |  |  | 35 | 65 | −80° C. |
| D. 12.8% methylhexanoic, 22.2% n-heptanoic, 65% 3,5,5-trimethyl-hexanoic/TMP | (1) | 28.18 | 6.2 | 10 | 90 | −80° C. |
|  | (2) | 5.10 |  | 25 | 75 | −80° C. |
|  |  |  |  | 35 | 65 | −80° C. |

TABLE 2-continued

| Acid/Polyol | cSt Viscosity (1) 40° C. (2) 100° C. | AECL | wt. % Lubricant | wt. % R152a | Miscibility Value |
|---|---|---|---|---|---|
| E. Isononanoic/TMP | (1) 40.31 (2) 6.14 | 7.2 | 10 25 35 | 90 75 65 | −80° C. −80° C. −80° C. |
| F. Isodecanoic/TMP | (1) 46.83 (2) 7.60 | 8.0 | 10 25 35 | 90 75 65 | None +70° C. +70° C. |
| G. methylhexanoic/TPE | (1) 28.00 (2) 5.20 | 5.7 | 10 25 35 | 90 75 65 | −80° C. −80° C. −80° C. |
| H. 2-ethylhexanoic/TPE | (1) 50.17 (2) 6.73 | 6.0 | 10 25 35 | 90 75 65 | −80° C. −80° C. −80° C. |
| I. 15% Isooctanoic, 85% 3,5,5-trimethyl-hexanoic/TPE | (1) 114.50 (2) 11.66 | 6.1 | 10 25 35 | 90 75 65 | −80° C. −80° C. −80° C. |
| J. 25% isodecanoic, 75% 3,5,5-trimethyl-hexanoic/TPE | (1) 111.52 (2) 11.51 | 6.6 | 10 25 35 | 90 75 65 | −80° C. −80° C. −80° C. |
| K. Isononanoic/TPE | (1) 83.92 (2) 9.93 | 7.2 | 10 25 35 | 90 75 65 | −20° C. +110° C. +70° C. |
| L. Isodecanoic/TPE | (1) 90.98 (2) 10.40 | 8.0 | 10 25 35 | 90 75 65 | None None None |

Note:
Methylhexanoic acid as used in all the examples refers to an isomeric mixture of 70 wt. % 2-methylhexanoic acid, 20 wt. % 2-ethylpentanoic acid, 5 wt. % n-heptanoic acid and the balance other heptanoic acid isomers.

What is claimed is:

1. A refrigeration working fluid comprising about 5 to 55 pans by weight of a synthetic polyol ester lubricant and about 95 to 45 parts by weight of 1,1-difluoroethane refrigerant, the ester having a viscosity range of from about 8 cSt. to 130 cSt. at 40° C. and the working fluid having a miscibility value of −20° C. or less, said miscibility value being the highest temperature at which immiscibility occurs over the composition range of said working fluid, wherein said ester is prepared by reacting: neopentylglycol, trimethylolpropane or technical grade pentaerythritol, defined as containing 85 to 92% by weight monopentaerythritol, 14 to 7% by weight dipentaerythritol and up to 2% by weight tripentaerythritol, with an acid mixture consisting of branched $C_7$ to $C_{10}$ alkyl monocarboxylic acids, and linear $C_7$ to $C_{10}$ alkyl monocarboxylic acids, said acid mixture having an average effective carbon chain length less than 8.0 and containing at least 25 weight % of said branched acids and up to 75 weight % of said linear acids.

2. The fluid of claim 1 where there is present 10 to 35 parts by weight of said ester lubricant and 90 to 65 parts by weight of said refrigerant.

3. The fluid of claim 1 or 2 wherein the ester is a neopentylglycol ester.

4. The fluid of claim 1 or 2 wherein the ester is a trimethylolpropane ester.

5. The fluid of claim 1 or 2 wherein the ester is a technical grade pentaerythritol ester.

6. The fluid of claim 1 or 2 which is present in admixtures with a refrigerant selected from the group consisting of tetrafluoroethane, pentafluoroethane, difluoroethane and trifluoroethane, said admixtures containing at least 35 wt. % of 1,1-difluoroethane based on the total weight of mixed refrigerants.

7. A refrigeration working fluid comprising about 5 to 55 parts by weight of a synthetic polyol ester lubricant and about 95 to 45 pans by weight of pentafluoroethane refrigerant, the ester having a viscosity can be of from about 8 est. to 130 est. at 40° C. and the working fluid having a miscibility value of −20° C. or less, said miscibility value being the highest temperature at which immiscibility occurs over the composition range of said working fluid, wherein said ester is prepared by reacting:

(i) technical grade pentaerythritol, defined as containing 85 to 92% by weight monopentaerythritol, 14 to 7% by weight dipentaerythritol and up to 2% by weight tripentaerythritol, an acid mixture consisting of branched $C_7$ to $C_{10}$ monocarboxylic acids and linear $C_7$ to $C_{10}$ monocarboxylic acids, said acid mixture having an average effective carbon chain length less than 7.2 and containing at least 25 weight % of said branched acids and up to 75 weight % of said linear acids, or.

(ii) trimethylolpropane or neopentyl glycol with an acid mixture consisting of branched $C_7$ to $C_{10}$ monocarboxylic acids and linear $C_7$ to $C_{10}$ alkyl monocarboxylic acids, said acid mixture having an average effective carbon chain length less than 8.0 and containing at least 25 weight % of said branched acids and up to 75 weight % of said linear acids.

8. The fluid of claim 7 where there is present 10 to 35 parts by weight of said ester lubricant and 90 to 65 parts by weight of said refrigerant.

9. The fluid of claim 7 or 8 wherein the polyol is technical grade pentaerythritol.

10. The fluid of claim 7 or 8 wherein the polyol is trimethylolpropane.

11. The fluid of claim 7 or 8 wherein the polyol is neopentyl glycol.

12. The fluid of claim 7 or 8 which is present in admixtures with a refrigerant selected from the group consisting of tetrafluoroethane, 1,1-difluoroethane, difluoromethane and trifluoroethane, said admixture containing at least 35 wt. % of pentafluoroethane based on the total weight of mixed refrigerants.

* * * * *